United States Patent
Muller et al.

(10) Patent No.: US 9,124,544 B2
(45) Date of Patent: Sep. 1, 2015

(54) DETECTING EXCEPTIONS FOR COLLABORATIVE OBJECT ADDRESSING

(75) Inventors: Michael Muller, Medford, MA (US); Andrew L. Schirmer, Andover, MA (US)

(73) Assignee: International Business Machines Corporation, Armonk, NY (US)

( * ) Notice: Subject to any disclaimer, the term of this patent is extended or adjusted under 35 U.S.C. 154(b) by 1838 days.

(21) Appl. No.: 11/967,766

(22) Filed: Dec. 31, 2007

(65) Prior Publication Data

US 2009/0172096 A1    Jul. 2, 2009

(51) Int. Cl.
*G06F 15/16* (2006.01)
*H04L 12/58* (2006.01)
*G06Q 10/10* (2012.01)

(52) U.S. Cl.
CPC .............. *H04L 51/28* (2013.01); *G06Q 10/10* (2013.01); *G06Q 10/107* (2013.01); *G06Q 10/103* (2013.01); *H04L 51/04* (2013.01); *H04L 51/30* (2013.01)

(58) Field of Classification Search
CPC .............................. G06Q 10/10; G06Q 10/103
USPC ....................................................... 709/204
See application file for complete search history.

(56) References Cited

U.S. PATENT DOCUMENTS

| 7,774,711 B2 * | 8/2010 | Valeski ........................ 715/752 |
| 2004/0193684 A1 * | 9/2004 | Ben-Yoseph ................. 709/204 |
| 2006/0053195 A1 * | 3/2006 | Schneider et al. ............ 709/204 |

OTHER PUBLICATIONS

Perkio, Jukka et al; Multi-Faceted Information Retrieval System for Large Scale Email Archives; pp. 557-564 in Proceedings of th e IEEE/WIC/ACM Conference on Web Intelligence (WI 2005).

* cited by examiner

*Primary Examiner* — Ashok Patel
*Assistant Examiner* — Lawrence Cosby
(74) *Attorney, Agent, or Firm* — Steven M. Greenberg, Esq.; CRGO Law

(57) ABSTRACT

Embodiments of the present invention address deficiencies of the art in respect to distribution list management for a collaborative object and provide a method, system and computer program product for detecting exceptions for collaborative object addressing in a collaborative computing environment. In an embodiment of the invention, a method for detecting exceptions for collaborative object addressing in a collaborative computing environment can be provided. The method can include retrieving a distribution list for a collaborative object in a collaborative computing environment, comparing addressees in the distribution list to addressees in a list of previously applied addressees, and providing a notification where an addressee in the distribution list does not appear as an addressee in the list of previously applied addresses.

20 Claims, 1 Drawing Sheet

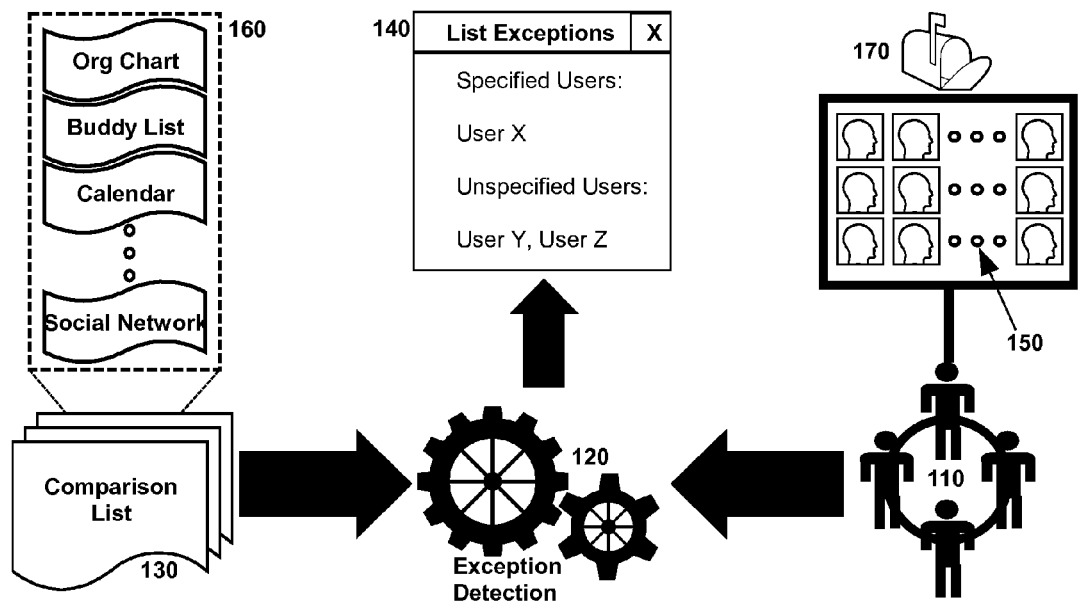
FIG. 1
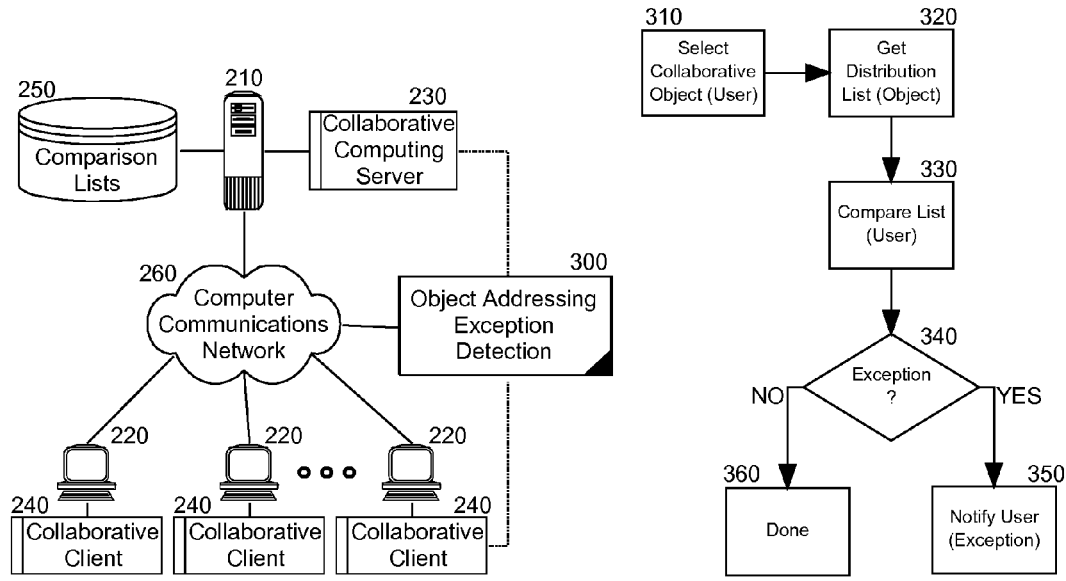
FIG. 2
FIG. 3

DETECTING EXCEPTIONS FOR COLLABORATIVE OBJECT ADDRESSING

BACKGROUND OF THE INVENTION

1. Field of the Invention

The present invention relates to the field of collaborative computing and more particularly to addressing collaborative objects in a collaborative computing environment.

2. Description of the Related Art

The rapid development of the Internet has led to advanced modes of communication and collaboration. Using the Internet as a backbone, individuals worldwide can converge in cyberspace to share ideas, documents and images in a manner not previously possible through conventional telephony and video conferencing. To facilitate collaboration over the Internet, a substantial collection of technologies and protocols has been assembled to effectively deliver audio, video and data over the single data communications medium of the Internet. These technologies include document libraries, e-mail messaging, instant messaging, chat rooms, and application sharing.

Conventional collaborative computing includes combinations of collaborative technologies in order to provide a means for members of a collaborative community to pool their strengths and experiences to achieve a common goal. For instance, a common goal can include an educational objective, the completion of a software development project or even the creation and use of a system to manage human resources. A collaborative computing community generally can be defined by (1) a particular context, i.e. the objective of the environment, (2) membership, i.e., the participants in the environment, (3) a set of roles for the members, and (4) resources and tools which can be accessed by the membership in furtherance of the objective of the environment. A role is a classification applied to a subset of the people in the environment that acts as a placeholder for the subset of the people in dictating access to the resources and tools within the environment, as well as defining the behavior of the community members.

Oftentimes, collaborative objects in a collaborative computing environment can be addressed in one form or another. In the basic circumstance, an e-mail or an instant message can be addressed to different recipients. In a more complicated circumstance, an e-meeting can be scheduled to include different participants—both required and optional (as well as "information only"). In yet even a more complicated circumstance, activities and tasks can be assigned or delegated to one or more persons or roles. In all cases, the mental process of selecting an appropriate distribution list for a collaborative object can be tedious and error prone.

In the past, to facilitate in the formulation of a distribution list for an e-mail message, comparable addressee lists used in previously transmitted e-mails have been used to suggest the addressee list for a new e-mail message. In particular, where a composed e-mail message includes only a partial form of the previously used addressee list, logic coupled to the e-mail client can suggest adding the excluded e-mail addresses to the addressee list. In this way, the mistake of accidentally omitting addressees from an address list can be avoided.

Though inferring omitted names from an addressee list can be helpful in detecting the exception of under-addressing an e-mail message, the problem remains of determining when impermissible addressees have been included in an e-mail message. In many circumstances, inadvertently including an addressee in an e-mail message can result in undesirable consequences—particularly where the e-mail message contains sensitive or otherwise private information.

E-mail addressing is only the most basic of tools in a collaborative computing environment. Other collaborative objects remain unprotected from the mistake of accidental mis-addressing. Of course, the problem of inadvertently included addresses in an addressee list for an e-mail message can be extended to inadvertently included persons in a distribution list for any collaborative object.

BRIEF SUMMARY OF THE INVENTION

Embodiments of the present invention address deficiencies of the art in respect to distribution list management for a collaborative object and provide a novel and non-obvious method, system and computer program product for detecting exceptions for collaborative object addressing in a collaborative computing environment. In an embodiment of the invention, a method for detecting exceptions for collaborative object addressing in a collaborative computing environment can be provided. The method can include retrieving a distribution list for a collaborative object in a collaborative computing environment, comparing addressees in the distribution list to addressees in a list of previously applied addressees, and providing a notification where an addressee in the distribution list does not appear as an addressee in the list of previously applied addresses.

In one aspect of the embodiment, retrieving a distribution list for a collaborative object in a collaborative computing environment can include retrieving a distribution list for an e-mail message, a meeting, or an activity, to name only a few collaborative objects in a collaborative computing environment. In another aspect of the embodiment, comparing addressees in the distribution list to addressees in a list of previously applied addressees can include comparing addressees and addressee sub-types in the distribution list to addressees and addressee sub-types in a list of previously applied addressees. In this regard, the sub-types can include a "to:", "cc:" or "bcc:" sub-type, or a "required", "optional" or "information only" sub-type, by way of example.

In yet another aspect of the embodiment, comparing addressees in the distribution list to addressees in a list of previously applied addressees can include comparing addressees in the distribution list to a union of addressees in multiple different lists of previously applied addressees. Conversely, comparing addressees in the distribution list to addressees in a list of previously applied addressees can include comparing addressees in the distribution list to an intersection of addressees in multiple different lists of previously applied addressees. Finally, in even yet another aspect of the embodiment, providing a notification where an addressee in the distribution list does not appear as an addressee in the list of previously applied addresses, further can include providing a notification also where an addressee in the list of previously applied addresses does not appear as an addressee in the distribution list.

In another embodiment of the invention, a collaborative computing data processing system can be provided. The system can include a collaborative computing server coupled to different collaborative computing clients over a computer communications network, such that the collaborative computing server can provide a collaborative computing environment accessible through the collaborative computing clients. The system also can include object addressing exception detection logic coupled to at least one of the server and the clients.

Notably, the logic can include program code enabled to compare addressees of a distribution list for a collaborative object with a comparison list of previously applied addressees in order to identify a differential set of addressees included in the distribution list and not the comparison list representing an exception of addressees included in error in the distribution list. For example, the comparison list can be a buddy list, a calendar of past scheduled meetings, tasks and activities or a listing of socially related addresses such as an organizational chart and a social network.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of a process for detecting exceptions for collaborative object addressing;

FIG. 2 is a schematic illustration of a collaborative computing data processing system configured for detecting exceptions for collaborative object addressing; and, FIG. 3 is a flow chart illustrating a process for detecting exceptions for collaborative object addressing.

DETAILED DESCRIPTION OF THE INVENTION

Embodiments of the present invention provide a method, system and computer program product for detecting exceptions for collaborative object addressing. In accordance with an embodiment of the present invention, a distribution list of collaborators can be established for a collaborative object in a collaborative computing environment. The distribution list can specify one or more addressees for the collaborative object. In response, the addressees of the distribution list can be compared to a comparison list of addresses in order to identify a differential set of addressees included in the distribution list and not the comparison list, and a differential set of addressees included in the comparison list and not the distribution list. The former can represent an exception of addressees included in error in the distribution list, while the latter can represent an exception of addresses omitted in error from the distribution list. Thereafter, notice can be provided of the exceptions.

In further illustration, FIG. 1 pictorially depicts a process for detecting exceptions for collaborative object addressing. As shown in FIG. 1, a distribution list 170 of addressees 150 can be specified for a collaborative object 110 in a collaborative computing system. The collaborative computing object 110 can include not only an e-mail message, but also an instant message, a task, an activity, a shared document, a calendared meeting, and the like. The distribution list 170 can include different types of addressees 150 which can vary depending upon the nature of the collaborative object 110. For a message, the different types can include "to:", "cc:" and "bcc:" type addressees, while for a meeting, the different types can include "required", "optional" and "information only" type addressees.

Exception detection logic 120 can process the distribution list 170 in order to compare the distribution list 170 to a comparison list 130. The comparison list 130 can include one or more different lists of previously specified addressees 160. The previously specified addressees 160 can include those gleaned from an organization chart for an organization, a buddy list, a calendar of past scheduled meetings, tasks and activities, and a social network, to name only a few. The comparison performed by the exception detection logic 120 can detect when a previously grouped set of addresses appearing to be similar to the distribution list 170 differs by an exception. The exception can include one or more addresses that differ by inadvertent inclusion in the distribution list 170 or inadvertent omission from the distribution list 170. Each identified exception can be reported in a list of exceptions 140 in order to facilitate an identification of the unintended inclusion or omission of addresses in the distribution list 170.

In further illustration, FIG. 2 is a schematic illustration of a collaborative computing data processing system configured for detecting exceptions for collaborative object addressing. The system can include a host computing platform 210 configured for communicative coupling to multiple different computing devices 220 over computer communications network 260. The host computing platform 210, which can include one or more server computing devices, can support the operation of a collaborative computing server 230, for example the Lotus™ Domino™ collaborative computing server manufactured by International Business Machines Corporation of Armonk, N.Y., United States of America. The collaborative computing server 230 in turn can provide a collaborative computing environment accessible through collaborative clients 240, for instance the well-known Lotus™ Notes™ collaborative computing client.

Notably, object addressing exception detection logic 300 can be coupled to the collaborative computing server 230, individually to the collaborative computing clients 240, or both. The object addressing exception detection logic 300 further can be coupled to a data store of comparison lists 250 coupled either to the host computing platform 210 as shown or optionally to each of the client computing platforms 220 (not shown). The object addressing exception detection logic 300 can include program code enabled to compare addressees of a distribution list for a collaborative object with one or more comparison lists in the data store 250 in order to identify a differential set of addressees included in the distribution list and not the comparison list, and a differential set of addressees included in the comparison list and not the distribution list. The former can represent an exception of addressees included in error in the distribution list, while the latter can represent an exception of addresses omitted in error from the distribution list. In consequence, the program code yet further can be enabled to provide notice of the exceptions.

In further illustration of the operation of the program code of the object addressing exception detection logic 300, FIG. 3 is a flow chart illustrating a process for detecting exceptions for collaborative object addressing. Beginning in block 310, a collaborative object can be selected a collaborative computing environment. In block 320 a distribution list can be obtained for the collaborative object. Thereafter, in block 330 the distribution list—specifically, the addressees in the list and the sub-types of addressees in the list can be compared to one or more previously applied lists. The comparison can include a one-to-one comparison to a single previously applied list, or a one to one comparison of a union or intersection of multiple previously applied lists.

Thereafter, in decision block 340, it can be determined whether or not an exception has arisen from the comparison. In this regard, the exception can include the inclusion of an addressee in the distribution list not found the single previously applied list of addressees, or in a union or intersection of multiple previously applied lists of addressees. Additionally, an exception can include the omission of an addressee in the distribution list found in the single previously applied list of addressees, or in a union or intersection of multiple previously applied lists of addressees. If an exception can be identified, in block 350 the user can be notified of the exception. Otherwise, in block 360 the process can end.

To the extent the user is notified of an exception, the user further can be provided with a dialog through which the compared list or lists of previously applied addressees can be edited. Alternatively, the distribution list itself can be persisted as a list of previously applied addressees for subsequent use in a comparison operation. If persisted, the distribution list can be annotated with meta-data helpful in analyzing the nature of the distribution list including dates of creation and the text of the collaborative object to which the distribution list had applied.

Finally, though the comparison operation can account for the omission or inclusion of an addressee in general, the comparison can account more granularly to the omission or inclusion of an addressee as a sub-type of addressee in a collaborative object. In this regard, though an addressee specified as one type in a distribution list may be found generally in a list of previously applied addressees, the type of addressee as found generally in the list of previously applied addressees can differ from that in the distribution list giving rise to an exception. For example, where an addressee may be included in a distribution list as a "to:" sub-type, if the addressee is found in a list of previously applied addressees only as a "cc:" sub-type, an exception still can arise.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable storage medium can be any apparatus that can contain or store the program for use by or in connection with the instruction execution system, apparatus, or device. The storage medium can be an electronic, magnetic, optical, electromagnetic, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for detecting exceptions for collaborative object addressing in a collaborative computing environment, the method comprising:
   retrieving a distribution list for a collaborative object in a collaborative computing environment provided by a collaborative computing server executing in memory by at least one processor of a host computing platform, the distribution list indicating multiple different collaborators assigned to the collaborative object;
   comparing addressees in the distribution list to addressees in a list of previously applied addressees; and,
   providing a notification where an addressee in the distribution list does not appear as an addressee in the list of previously applied addresses.

2. The method of claim 1, wherein retrieving a distribution list for a collaborative object in a collaborative computing environment, comprises retrieving a distribution list for a collaborative object in a collaborative computing environment, the collaborative object comprising an e-mail message.

3. The method of claim 1, wherein retrieving a distribution list for a collaborative object in a collaborative computing environment, comprises retrieving a distribution list for a collaborative object in a collaborative computing environment, the collaborative object comprising a meeting.

4. The method of claim 1, wherein retrieving a distribution list for a collaborative object in a collaborative computing environment, comprises retrieving a distribution list for a collaborative object in a collaborative computing environment, the collaborative object comprising an activity.

5. The method of claim 1, wherein comparing addressees in the distribution list to addressees in a list of previously applied addressees, comprises comparing addressees and addressee sub-types in the distribution list to addressees and addressee sub-types in a list of previously applied addressees.

6. The method of claim 1, wherein comparing addressees in the distribution list to addressees in a list of previously applied addressees,
   comprises comparing addressees in the distribution list to a union of addressees in multiple different lists of previously applied addressees.

7. The method of claim 1, wherein comparing addressees in the distribution list to addressees in a list of previously applied addressees, comprises comparing addressees in the distribution list to an intersection of addressees in multiple different lists of previously applied addressees.

8. The method of claim 1, wherein providing a notification where an addressee in the distribution list does not appear as an addressee in the list of previously applied addresses, further comprises providing a notification also where an addressee in the list of previously applied addresses does not appear as an addressee in the distribution list.

9. A collaborative computing data processing system comprising:
   a collaborative computing server executing in a host computing platform and coupled to a plurality of collaborative computing clients over a computer communications network, the collaborative computing server
providing a collaborative computing environment accessible through the collaborative computing clients; and,
object addressing exception detection logic coupled to at least one of the server and the clients, the logic comprising program code enabled to compare addressees of a distribution list for a collaborative object, the distribution list indicating multiple different collaborators assigned to the collaborative object, with a comparison list of previously applied addressees in order to identify a differential set of addressees included in the distribution list and not the comparison list representing an exception of addressees included in error in the distribution list.

10. The system of claim 9, wherein the comparison list of previously applied addressees comprises a buddy list.

11. The system of claim 9, wherein the comparison list of previously applied addressees comprises a calendar of past scheduled meetings, tasks and activities.

12. The system of claim 9, wherein the comparison list of previously applied addressees comprises a listing of socially related
addresses selected from the group consisting of an organizational chart and a social network.

13. A non-transitory computer program product comprising a computer usable storage medium storing computer usable program code executed by a processor for detecting exceptions for collaborative object addressing in a collaborative computing environment, the computer program product comprising:
computer usable program code for retrieving a distribution list for a collaborative object in a collaborative computing environment, the distribution list indicating multiple different collaborators assigned to the collaborative object;
computer usable program code for comparing addressees in the distribution list to addressees in a list of previously applied addressees; and,
computer usable program code for providing a notification where an addressee in the distribution list does not appear as an addressee in the list of previously applied addresses.

14. The non-transitory computer program product of claim 13, wherein the computer usable program code for retrieving a distribution list for a collaborative object in a collaborative computing environment, comprises computer usable program code for retrieving a distribution list for a collaborative object in a collaborative computing environment, the collaborative object comprising an e-mail message.

15. The non-transitory computer program product of claim 13, wherein the computer usable program code for retrieving a distribution list for a collaborative object in a collaborative computing environment, comprises computer usable program code for retrieving a distribution list for a collaborative object in a collaborative computing environment, the collaborative object comprising a meeting.

16. The non-transitory computer program product of claim 13, wherein the computer usable program code for retrieving a distribution list for a collaborative object in a collaborative computing environment, comprises computer usable program code for retrieving a distribution list for a collaborative object in a collaborative computing environment, the collaborative object comprising an activity.

17. The non-transitory computer program product of claim 13, wherein the computer usable program code for comparing addressees in the distribution list to addressees in a list of previously applied addressees, comprises computer usable program code for comparing addressees and addressee sub\-types in the distribution list to addressees and addressee sub-types in a list of previously applied addressees.

18. The non-transitory computer program product of claim 13, wherein the computer usable program code for comparing addressees in the distribution list to addressees in a list of previously applied addressees, comprises computer usable program code for comparing addressees in the distribution list to a union of addressees in multiple different lists of previously applied addressees.

19. The non-transitory computer program product of claim 13, wherein the computer usable program code for comparing addressees in the distribution list to addressees in a list of previously applied addressees, comprises computer usable program code for comparing addressees in the distribution list to an intersection of addressees in multiple different lists of previously applied addressees.

20. The non-transitory computer program product of claim 13, wherein the computer usable program code for providing a notification where an addressee in the distribution list does not appear as an addressee in the list of previously applied addresses, further comprises computer usable program code for providing a notification also where an addressee in the list of previously applied addresses does not appear as an addressee in the distribution list.

* * * * *